(12) United States Patent
Yoshimura et al.

(10) Patent No.: US 7,061,702 B2
(45) Date of Patent: Jun. 13, 2006

(54) MASTER DISK DEVICE FOR TRANSFERRING MAGNETIC PATTERNS TO BOTH SIDES OF A MAGNETIC RECORDING MEDIUM, AND ALIGNMENT DEVICE THEREFOR AND ALIGNMENT METHOD THEREOF

(75) Inventors: Hiroyuki Yoshimura, Tokyo (JP); Kiminori Sato, Nagano (JP)

(73) Assignee: Fuji Electric Device Technology Co., Ltd.

( * ) Notice: Subject to any disclaimer, the term of this patent is extended or adjusted under 35 U.S.C. 154(b) by 147 days.

(21) Appl. No.: 10/714,815

(22) Filed: Nov. 17, 2003

(65) Prior Publication Data

US 2004/0223244 A1 Nov. 11, 2004

(30) Foreign Application Priority Data

Nov. 15, 2002 (JP) ............................. 2002-332641
Dec. 25, 2002 (JP) ............................. 2002-375405

(51) Int. Cl.
*G11B 5/86* (2006.01)

(52) U.S. Cl. ............................. 360/16; 360/15; 360/17
(58) Field of Classification Search ............. 360/15–17
See application file for complete search history.

(56) References Cited

U.S. PATENT DOCUMENTS

| 6,721,113 B1 * | 4/2004 | Matsuda et al. ............... 360/15 |
| 2002/0015246 A1 | 2/2002 | Matsuda et al. |
| 2002/0081018 A1 * | 6/2002 | Hamano et al. ............ 382/151 |

FOREIGN PATENT DOCUMENTS

| JP | 11-175973 A | | 7/1999 |
| JP | 2000-067433 | * | 3/2000 |
| JP | 2000-67433 A | | 3/2000 |
| JP | 2001-34939 A | | 2/2001 |
| JP | 2001-351232 A | | 12/2001 |
| JP | 2002-197647 | * | 7/2002 |
| JP | 2002-197647 A | | 7/2002 |

OTHER PUBLICATIONS

"Magnetic Printing Technology"; K. Sato et al.; Fuji Electric Journal vol. 75, No. 3; pp. 173-177; (2002); English Abstract.

Relevant portion of Austrian Search Report mailed Jul. 22, 2005.

* cited by examiner

*Primary Examiner*—David Hudspeth
*Assistant Examiner*—Natalia Figueroa
(74) *Attorney, Agent, or Firm*—Rossi, Kimms & McDowell, LLP

(57) ABSTRACT

To enable alignment of a magnetic pattern of a pair of master disks and a magnetic recording medium, each of the master disks has at least a pair of alignment marks disposed outside the region of the magnetic pattern. The master disks can be optically transparent or semi-transparent. The master disks can be aligned while the alignment marks are externally observed.

23 Claims, 13 Drawing Sheets

Fig. 1A
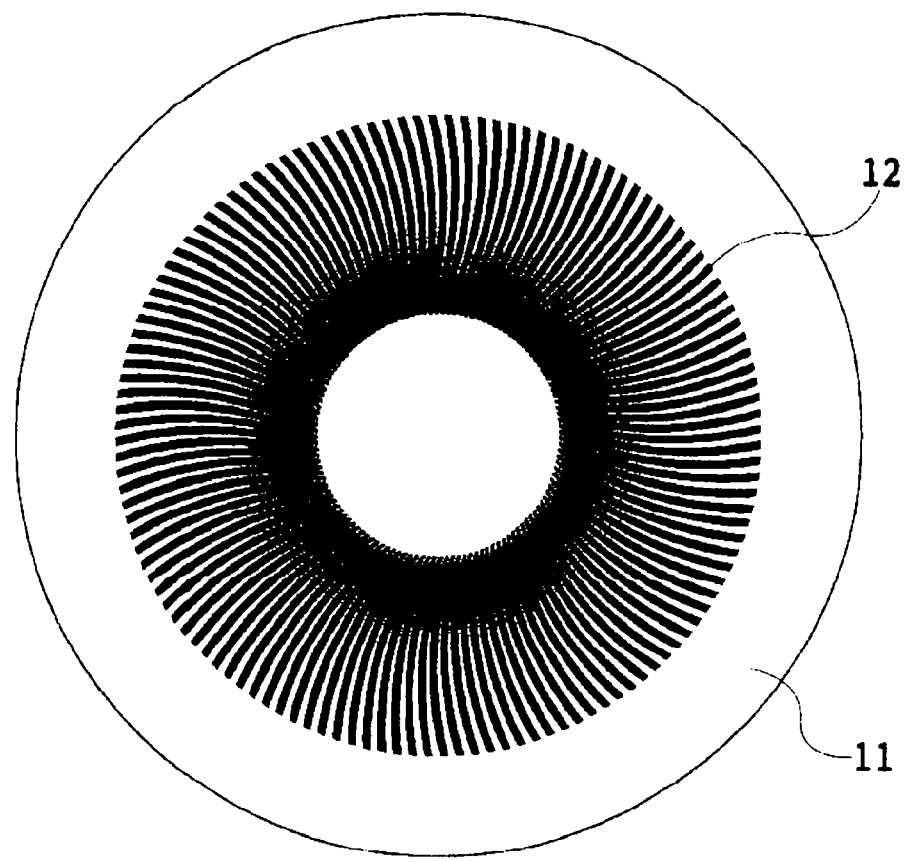
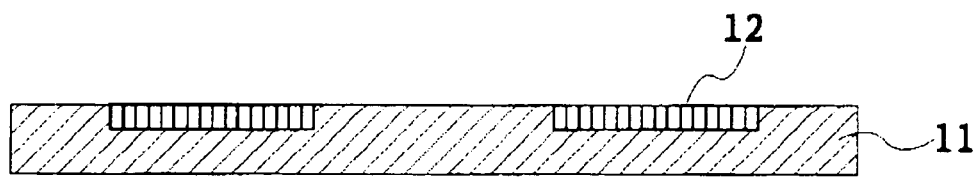
Fig. 1B

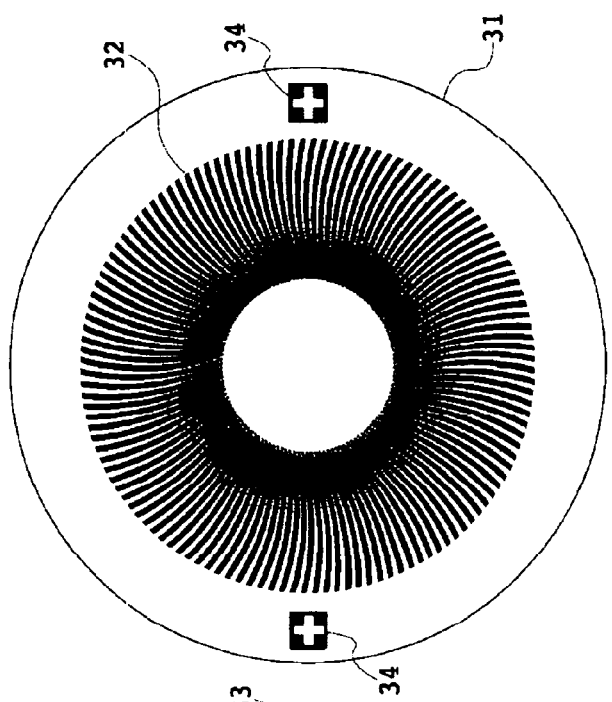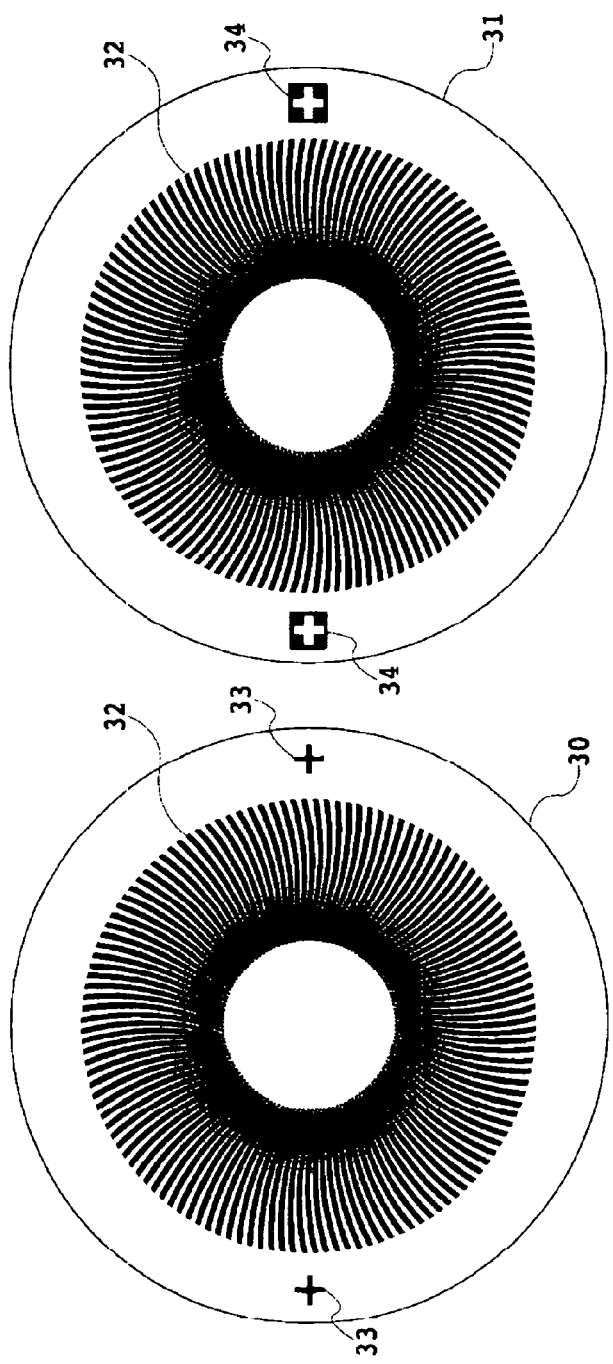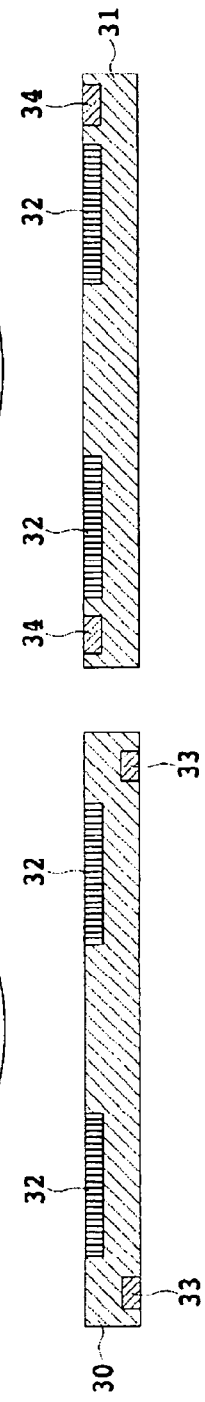

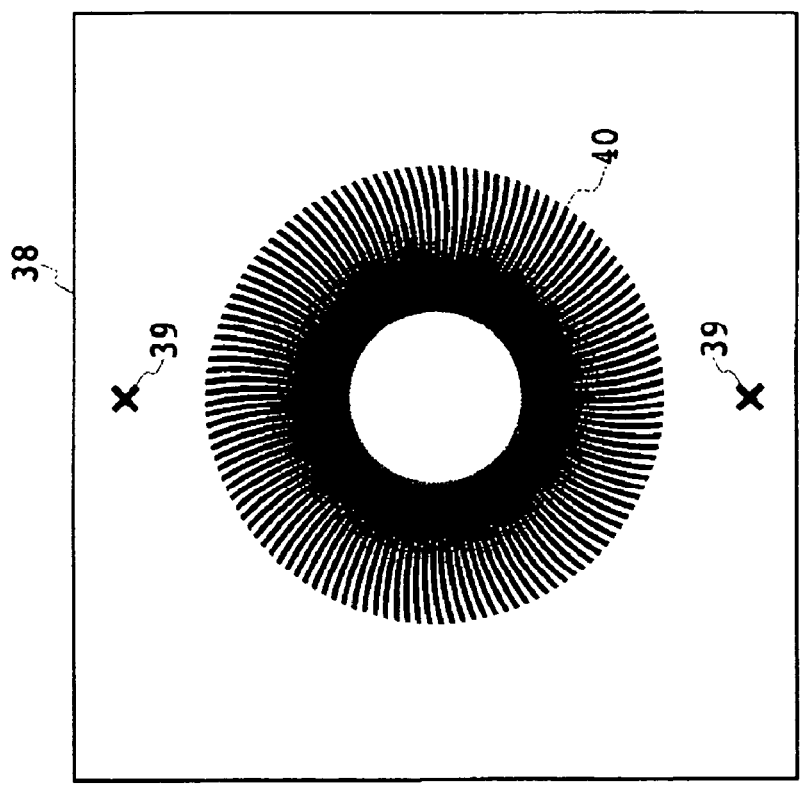
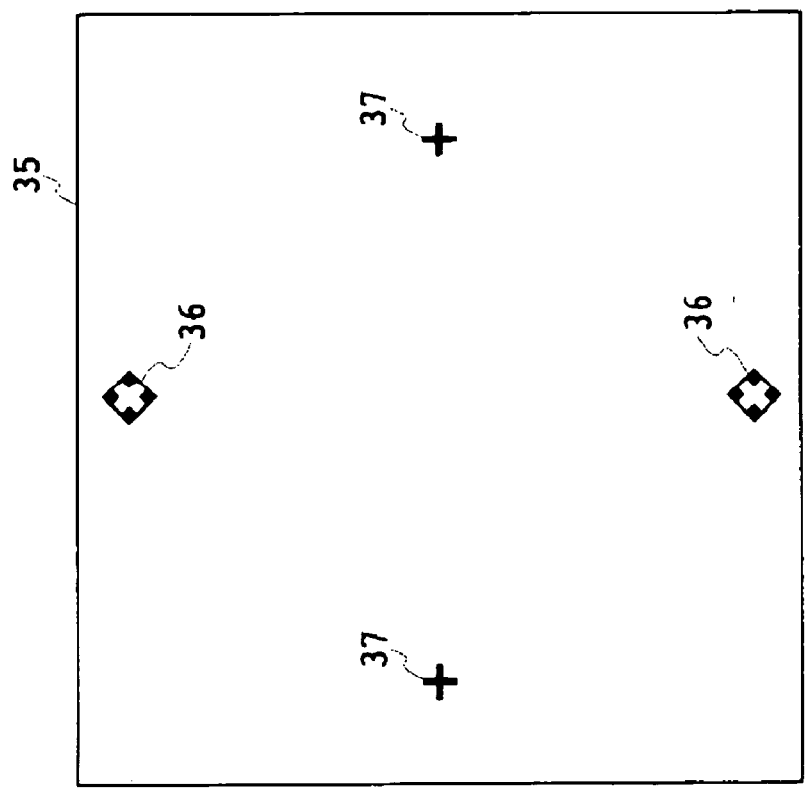
Fig. 9B
Fig. 9A

MASTER DISK DEVICE FOR TRANSFERRING MAGNETIC PATTERNS TO BOTH SIDES OF A MAGNETIC RECORDING MEDIUM, AND ALIGNMENT DEVICE THEREFOR AND ALIGNMENT METHOD THEREOF

BACKGROUND

Presently, hard disk drives (abbreviated below as HDD) have become the mainstream of external storage devices of computers. An HDD uses a magnetic recording medium having a magnetic film as a recording material, and an alignment servo signal of a writing/reading head prerecorded on the magnetic recording medium using a magnetic transfer technique.

In an HDD, the recording and playback of data is transferred (read/written) while the magnetic head is levitated closely (about several tens of nm) above the rotating recording medium, by a levitation mechanism called a slider. Bit information on the magnetic recording medium is stored in concentrically disposed data tracks, and a data recording/playback head is moved and positioned at a high speed to the target data track on the medium surface to record and play back data.

Alignment signals (servo signals) for detecting the relative position between the head and the data tracks are concentrically written on the magnetic recording medium surface, and the head conducting the recording and playback of data detects its own position at fixed time intervals. After the magnetic recording medium has been loaded into an HDD device, writing signals are written thereto using a dedicated device called a servo writer so that the centers of the writing signals of the servo signals do not become decentered from the center of the medium (or center of locus of the head). At present, recording density has reached 100 Gbits/in$^2$ at the development stage, and recording capacity is increasing at an annual rate of 60%. In accompaniment therewith, the density of servo signals for the head to detect its own position is also rising, and the trend is such that the writing time of the servo signals is also increasing annually. This increase in the writing time of the servo signals is largely the cause of the drop in the productivity and an increase in the cost of HDDs.

Recently, with respect to a method where the servo signals are written using the signal writing head of the servo writer, remarkable technological developments have been made that attempt to shorten the writing time of servo information by writing the entire servo signals at once by magnetic transfer technology. FIGS. 12A–12C and 13A–13B illustrate this magnetic transfer technology (see JP-A-2001-34939 for example). FIG. 13A illustrates a state where a permanent magnet 2 is moved over the surface of a magnetic recording medium 1, while maintaining a fixed interval (1 mm or less), represented from a cross-sectional direction of a substrate. A magnetic film 4 formed on a substrate 3 is initially not in a state where it has been unidirectionally magnetized, but is unidirectionally magnetized by a magnetic field leaking from a gap in the permanent magnet 2 (arrows 5 written in the magnetic film in the drawing represent the direction of magnetization). This process is called an initial demagnetization process. An arrow 6 in FIG. 12A represents the movement path of the permanent magnet on the magnetic recording medium, and the magnetic layer is uniformly magnetized in the circumferential direction.

FIG. 12B illustrates a state where a master disk 7 for magnetic transfer (abbreviated below as a master disk) is disposed and positioned above the magnetic recording medium 1. FIG. 12C illustrates a state where magnetic transfer is conducted by tightly adhering the master disk to the surface of the magnetic recording medium and moving the permanent magnet for magnetic transfer along the movement path in the drawing (represented by arrow 6).

FIG. 13B illustrates the magnetic transfer technique. The master disk 7 has soft magnetic films 9 (e.g., Co soft magnetic films) imbedded in the surface of a silicon substrate 8 that contacts the medium surface. When the substrate 8 with the pattern of the embedded soft magnetic films is interposed between the permanent magnet 2 and the magnetic recording medium 1, the magnetic field (the orientation of the transfer signal writing magnetic field is in the direction opposite to that of the demagnetization magnetic field) that has leaked from the permanent magnet 2 and penetrated the silicon substrate 8 is again transmitted through the silicon substrate 8 at positions where there is no soft magnetic film so that the magnetic layer can be magnetized (the direction of magnetization thereof is represented by arrows 10), but passes through the soft magnetic films 9 at the portions where the soft magnetic pattern is present to form magnetic paths of small magnetic resistance. For this reason, the magnetic field leaking from the silicon substrate 8 at the positions where the soft magnetic layers are present becomes small and new magnetization writing is not made. Magnetic transfer of the servo signals is thus conducted by the above technique. It should be noted that a technology that conducts center alignment of the master disk for magnetic transfer and the magnetic recording medium has also been proposed (see JP-A-11-175973 for example).

Also, using both sides of the magnetic recording medium of the HDD by forming magnetic films on the surface and undersurface to increase the recording capacity per single medium has become the mainstream. Of the magnetic patterns recorded on the magnetic recording medium, there are the above-described servo pattern and a data pattern. For this reason, magnetic transfer is being conducted by tightly adhering a master disk to both surface sides of the magnetic recording medium (see JP-A-2000-67433 for example). A transparent base material can also be used as a master disk (see JP-A-2000-197647 for example).

In an HDD device using a magnetic recording medium where magnetic films are formed on the surface and undersurface, numerous magnetic disks are disposed, magnetic heads are individually disposed at the surface and undersurface thereof. Moreover, only an HSA (Head Stack Assembly) disposed with a head corresponding to a cylinder having a designated data region is controlled by servo control to be at a predetermined position, while not controlling the other HSA. Thus, when the misalignment between the surface and undersurface servo patterns is large in a case where the reading and writing cylinder is changed from the surface to the undersurface, there is the problem that time is required until stabilization of the position by the servo of the HSA at the undersurface and, as a result, settling time corresponding to the reading time of the data after the cylinder switching increases. For this reason, it becomes extremely important for there to be no misalignment between the surface and undersurface magnetic patterns of the magnetic recording medium to not compromise high-speed data access of the HDD. With respect to conventional magnetic transfer target patterns, because photoprocessing technology that forms the master disks has been based on a μm rule, there have only been servo patterns having a large pattern width. But when consideration is given to the fact that the utility of magnetic transfer and photoprocessing technology are progressing and have become based on a sub-μm rule, data patterns should also be thought of as transfer targets in addition to the conventional servo patterns and magnetic transfer by high-density master disks to the magnetic recording medium becoming necessary.

Thus, there is a need to precisely align the magnetic pattern of a surface-use master disk and the magnetic pattern of an undersurface-use master disk of a magnetic recording medium, and to precisely align the center of the magnetic recording medium with the centers of the magnetic patterns of the master disks while the surface and undersurface master disks are precisely aligned. The present invention addresses this need.

SUMMARY OF THE INVENTION

The present invention relates to a master disk device for transferring magnetic patterns to both sides of a magnetic recording medium, and an alignment device therefor and an alignment method thereof.

One aspect of the present invention therefore is a master disk device for transferring magnetic patterns to both sides of a magnetic recording medium. The master disk device comprises a first master disk and a second master disk. The first master disk has a first magnetic pattern formed on one side thereof for transferring the first magnetic pattern to one side of the magnetic recording medium. The second master disk has a second magnetic pattern formed on one side thereof for transferring the second magnetic pattern to the other side of the magnetic recording medium. Each of the first and second master disks has at least two alignment marks disposed outside the region of the magnetic pattern.

The alignment marks of each of the master disks are symmetrically disposed with respect to predetermined reference points of the respective magnetic pattern. The alignment marks of the first master disk and the alignment marks of the second master disk can have complementary configurations or even different configurations. At least one of the master disks can be optically transparent or semi-transparent. Both can be optically transparent or semi-transparent.

The alignment marks of at least one of the first and second master disks can be positioned on the same side where the magnetic pattern is formed. The alignment marks of the other of the first and second master disks can be positioned on the side opposite where the magnetic pattern is formed. Alternatively, the alignment marks of each of the first and second master disks can be positioned on the same side where the respective magnetic pattern is formed.

Another aspect of the present invention is a device for aligning a magnetic recording medium to the first and second master disks described above. The alignment device includes a first stage, a second state, and observation means. The first stage can movably and rotatably hold one of the first and second master disks. The second stage can movably hold the magnetic recording medium between the first and second master disks, with the first and second master disks positioned with the magnetic pattern sides thereof facing the magnetic recording medium. The observing means can observe the positions of the alignment marks of the first and second master disks and an end surface position of an inner periphery or an outer periphery of the magnetic recording medium.

The observing means can include first observing means for observing only the positions of the alignment marks of the first and second master disks and second observing means for observing the positions of the alignment marks of the pair of master disks and the end surface position of the inner periphery or the outer periphery of the magnetic recording medium.

Another aspect of the present invention is a method of transferring magnetic patterns to both sides of a magnetic recording medium. The method includes the steps of positioning the first master disks next to the second master disk so that the first and second magnetic patterns face each other; moving or rotating, or both, one of the master disks that is transparent or semi-transparent relative to the other while observing the alignment marks of the first and second master disks with first observing means to align the alignment marks of the first and second master disks; positioning the magnetic recording medium between the first and second master disks; observing with second observing means the alignment marks of the master disks and an inner peripheral or outer peripheral end surface of the magnetic recording medium; and moving the magnetic recording medium with respect to the aligned first and second master disks based on observation results of the second observing means.

The first observation means and the second observation means can observe the alignment marks through the first and second magnetic disks. Here, the alignment marks of the first and second master disks can be positioned on the same side where the respective magnetic pattern is formed.

Alternatively, the method can include the steps of fixing the position of one of the first and second master disks; observing the alignment marks of the one master disk with observing means; movably positioning the magnetic recording medium next to the one master disk with the magnetic pattern side of the one master disk facing the magnetic recording medium; observing with the observing means, an inner peripheral or outer peripheral end surface of the magnetic recording medium positioned next to the one master disk; moving the magnetic recording medium with respect to the one master disk based on observation results of the observation of the alignment marks of the one master disk and the magnetic recording medium to align the magnetic recording medium with respect to the one master disk; movably and rotatably positioning the other of the master disks next to the magnetic recording medium so that the magnetic recording medium is positioned between the first and second master disks and the magnetic pattern side of the other master disk facing the magnetic recording medium; observing with the observing means the alignment marks of the other magnetic disk; and moving or rotating or both the other master disk with respect to the one master disk based on the observation results of the alignment marks of the one master disk and the other master disk to align the marks of the first and second master disks.

Here, the alignment marks of the other master disk can be positioned on the same side where the magnetic pattern is formed and the alignment marks of the one master disk can be positioned on the side opposite where the magnetic pattern is formed.

BRIEF DESCRIPTION OF THE DRAWINGS

FIG. 1A is a top elevational view showing the configuration of a master disk according to the present invention.

FIG. 1B is a cross-sectional view of FIG. 1A.

FIG. 7A–7D illustrate another embodiment of the master disks disposed with alignment marks.

FIGS. 9A and B illustrate patterning photomasks of the master disk.

DETAILED DESCRIPTION

Although references are made here to directions in describing the structure, they are made relative to the drawings (as normally viewed) for convenience of description. The directions, such as upper, lower, top, bottom, first, second etc., are not intended to be taken literally or limit the present invention in any form.

FIGS. 1A–1B illustrate one embodiment of a master disk according to the present invention. Although the configuration of the present master disk is the same as that of a conventional master disk formed from an Si substrate, but the present master disk includes an optically transparent material, such as quartz. FIG. 1A illustrates a top elevational view showing the main surface thereof and FIG. 1B illustrates a cross section thereof. The present master disk can comprise a transparent substrate 11 and a magnetic pattern composed of quartz embedded in the substrate 11.

Figure 2A:
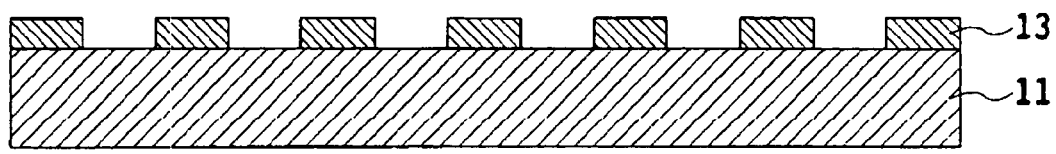
FIGS. 2A–2D illustrate a method of manufacturing the master disk of FIGS. 1A–1B.
Figure 2B:
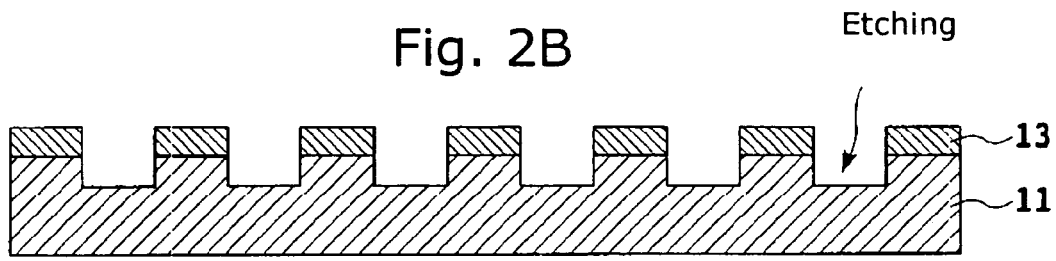
Figure 2C:
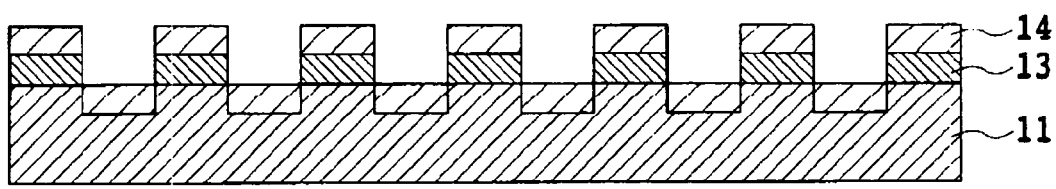
Figure 2D:
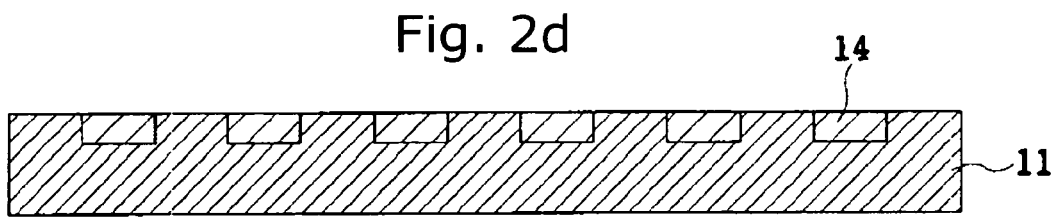

Referring to FIGS. 2A–2D, during the manufacture of the master disk, similar to that of a conventional Si substrate, after a patterning a photoresist 13 with a uniform thickness on the quartz embedded substrate 11, the photoresist 13 is developed to form grooves (FIG. 2A). The patterned substrate is etched using the photoresist as a mask (FIG. 2B). Thereafter, a soft magnetic film 14 is formed on the surface of the substrate to cover at least the grooves (FIG. 2C). Thereafter, the photoresist is lifted-off together with the soft magnetic film formed on the areas outside the grooves to complete the master disk (FIG. 2d). Here, the magnetic pattern comprising soft magnetic films and alignment marks (nontransparent) described later are formed on the quartz embedded substrate 11.

Figure 3B:
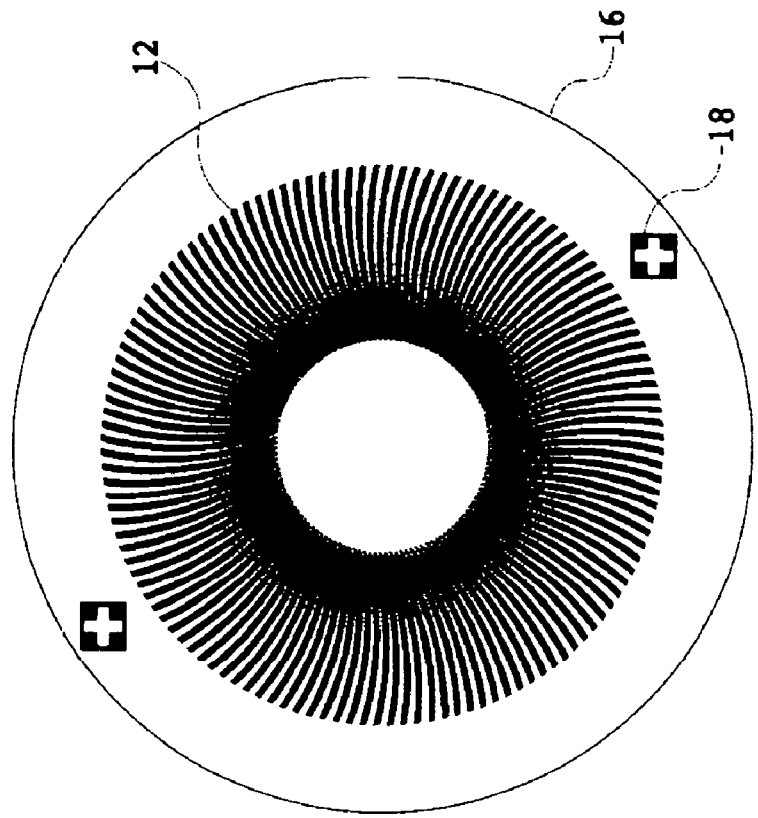
FIGS. 3A and 3B illustrate the master disks disposed with alignment marks.
Figure 3A:
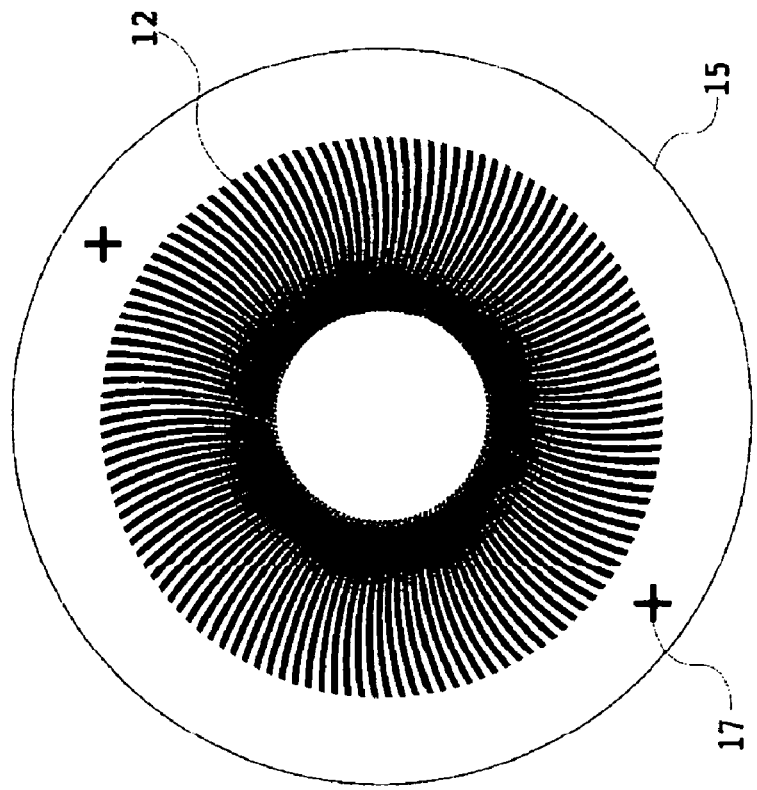

FIGS. 3A–3B illustrate the patterns of a master disk 15 for one side (hereafter first side) and a master disk 16 for the opposite side (hereafter second side) of a magnetic recording medium, as seen from the sides of the master disks that face the magnetic recording medium, with two alignment marks 17 and 18 disposed outside of the magnetic patterns 12. Note that the "first" and "second" are arbitrary designations and thus should not be literally taken. The first and second designations are interchageable. These alignment marks can be formed simultaneously with the formation of the soft magnetic films. As for the number of alignment marks, two on each disk is sufficient, but additional marks can be added as needed or desired.

Referring to FIGS. 4A–4D, the shapes of the alignment marks are mutually configured as complementary for added alignment precision. That is, the alignment marks 17 of one master disk 15 have cross shapes and the alignment marks 18 of the other master disk 16 have hollowed cross shapes so that the crosses of the alignment marks 17 can fit thereinside. It should be noted that the particular configuration of the alignment marks are not limited thereto. Any mutually complementary shapes can be used. For example, they can be configured from dot patterns (the marks of the two disks 15 and 16 being the same) irregularly arranged. In this case, the dot patterns between the two disks 15 and 16 can be matched.

Figure 4A:
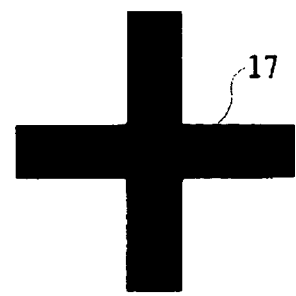
FIGS. 4A–4D illustrate alignment conditions of the alignment marks of surface/undersurface of the master disks.
Figure 4B:
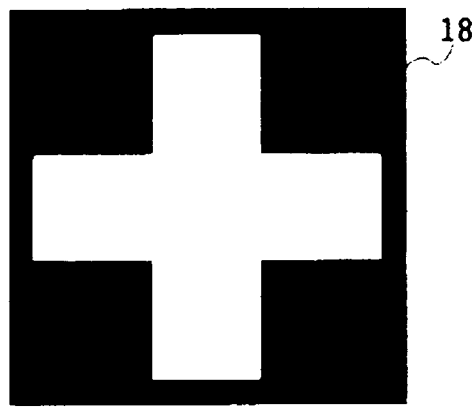
Figure 4C:
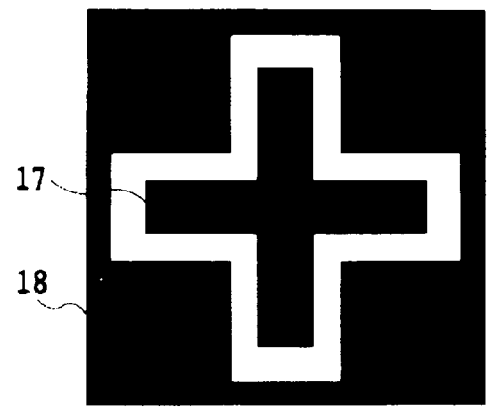
Figure 4D:
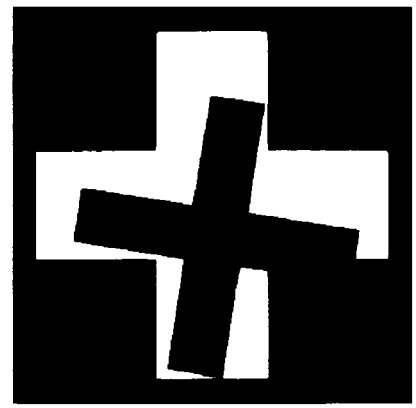

The positional relationship between the alignment marks and the magnetic patterns resulting from the soft magnetic films in the master disks is such that both master disks are in a symmetrical relationship. When the magnetic pattern surfaces resulting from the soft magnetic films of the first master disk and the second master disk are made to face each other, with the magnetic recording medium sandwiched therebetween, the superposition of these is observable from the other side because the master disks are transparent. When the position (X, Y, θ) of one master disk with respect the other master disk is adjusted so that the alignment marks match (are aligned), as shown in FIG. 4C (X and Y are orthogonal coordinate axes on a plane and θ is a rotation angle on the plane), the positions of the magnetic patterns resulting from the soft magnetic films match. FIG. 4D illustrates a state where the alignment marks are not precisely aligned (θ is not aligned).

Figure 5:
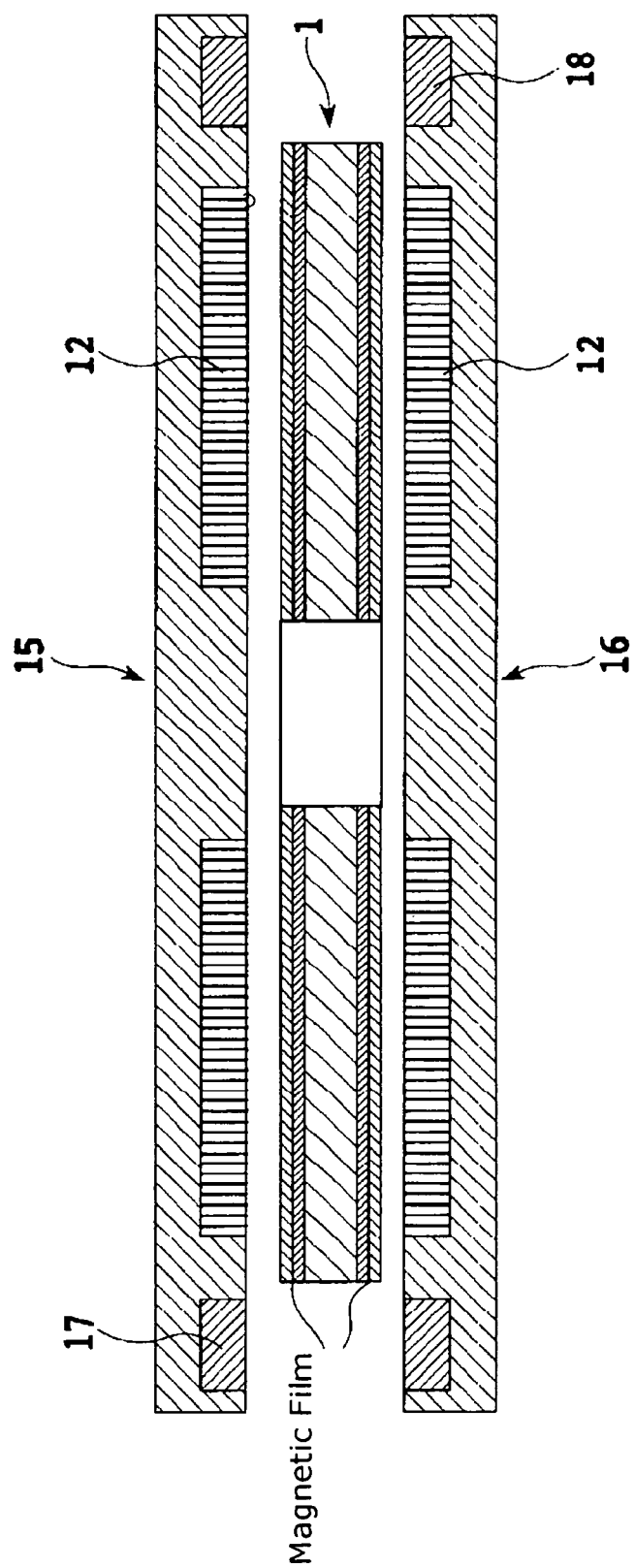
FIG. 5 illustrates the positional relationship of a magnetic recording medium and the master disks.
Figure 6:
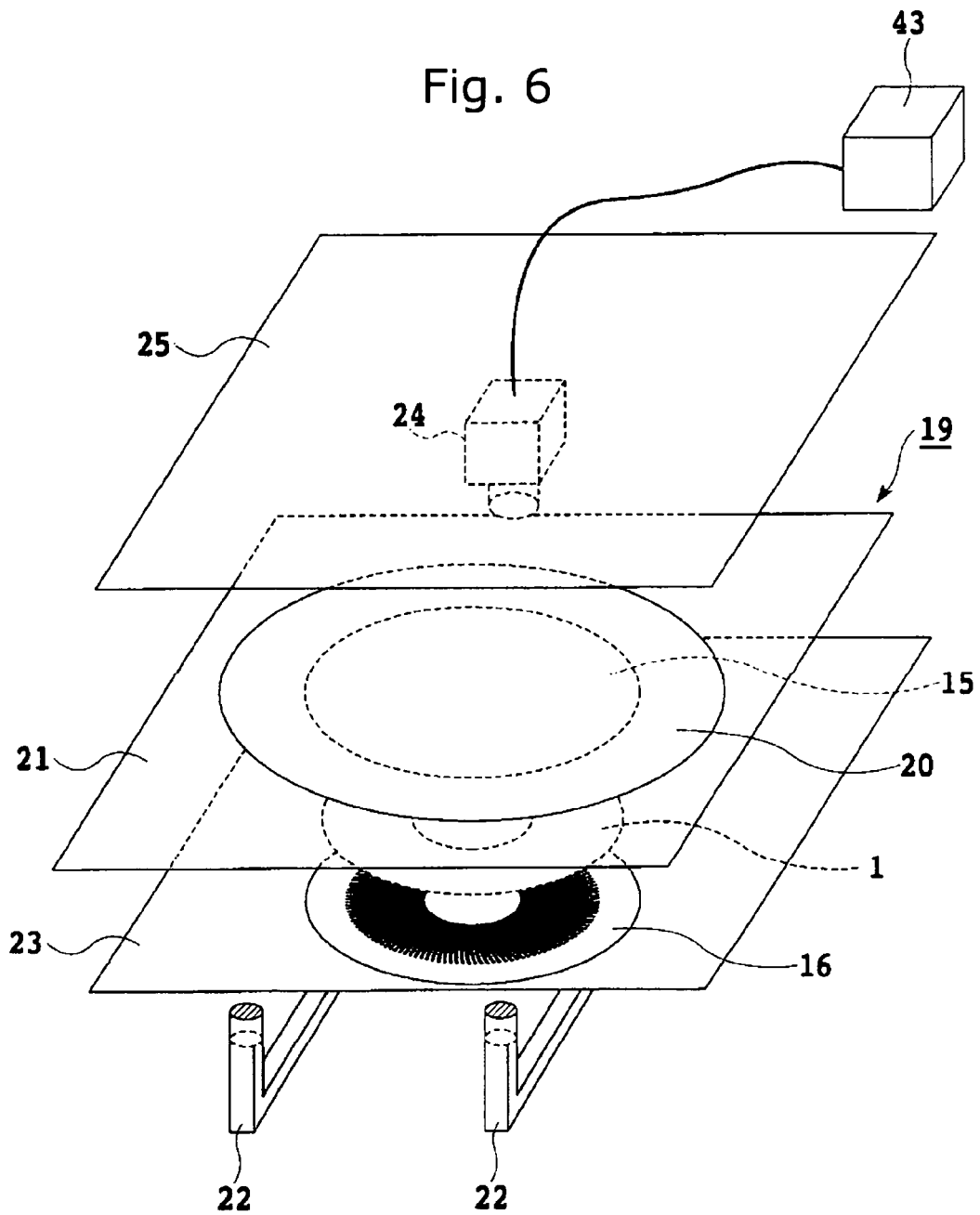
FIG. 6 illustrates an alignment device of a two-side magnetic transfer device according to the present invention.

FIG. 5 illustrates the positional relationship between the magnetic recording medium 1 and the master disks 15 and 16. The magnetic recording medium 1 is sandwiched between the magnetic patterns 12 resulting from the soft magnetic films so that the magnetic pattern 12 resulting from the soft magnetic films of the second master disk 16 faces the undersurface of the magnetic recording medium 1 and the magnetic pattern 12 resulting from the soft magnetic films of the first master disk 15 faces the surface of the magnetic recording medium 1. For the recording the magnetic patterns of these master disks to the magnetic recording medium 1, the center alignment of the magnetic patterns 12 of the master disks with the shape of the magnetic recording medium 1 is checked to see that it is within an acceptable limit. In order for the misalignment to be equal to or less than the acceptable value, alignment is conducted using an alignment device, such as shown in FIG. 6, disposed in a two-side magnetic transfer device. In this alignment device, movement control of respective stages, processing of signals from a television camera and control of respective positions are conducted by a signal processing device 43 with a computer.

As shown in FIG. 6, the second master disk 16 is fixedly positioned on a holder or the like (not illustrated). A first stage 19, which is disposed thereabove, includes a rotating stage 20, which retains the peripheral portion thereof so that the first master disk 15 is parallel to the second master disk 16, and an X, Y stage 21, on which the rotating stage 20 is disposed so that the rotating stage 20 is rotatable on a plane and movable in X and Y (orthogonal) directions with respect to the second master disk 16. The superposition of the alignment marks of the two master disks can be observed from below the second master disk 16 with microscopes 22 serving as observing means. The signal processing device, while observing this superposition, can control the rotating stage 20 and the X, Y stage 21 the respective orthogonal movement (X, Y) and rotational movement (θ) of the master disk 15 with respect to the second master disk 16, to align the alignment marks as illustrated in FIG. 4C.

A second stage 23 includes the function of being orthogonally movable on a plane with respect to the two master disks in a state where the periphery of the magnetic recording medium 1, to which the magnetic patterns are to be transferred, is retained by a retention mechanism, such as a knife edge, movable between the two master disks 15 and 16 and positioned parallel to these disks. A TV camera 24 serving as observing means can be fixed above the first master disk 15, and a third stage 25 that is orthogonally (X, Y) movable on a plane parallel to the magnetic recording medium 1 can be disposed.

Thus, in a state where the magnetic recording medium 1 is positioned between the two master disks 15 and 16 whose alignment marks have been aligned, the third stage 25 can be driven in orthogonal directions, the position of the inner periphery or the outer periphery of the magnetic recording medium 1 can be viewed along the full circle along the periphery by the TV camera 24 serving as the observing means from above the first master disk 15. The camera 24 can measure the inner peripheral end shape or the outer peripheral end shape of the magnetic recording medium 1 from the movement position information of the third stage 25 at that time and from the position information of pixels corresponding to the periphery of the magnetic recording medium 1 in imaging pixels of the TV camera 24, and can estimate the center position of the magnetic recording medium 1 from the measurement data. Next, the positions of the two master disks 15 and 16 whose alignment marks have been aligned can be measured by the TV camera 24 to determine the center positions of the master disks. Next, the second stage 23 retaining the magnetic recording medium 1 can be driven in the X and Y directions and controlled so as to eliminate misalignment between the estimated center position of the magnetic recording medium 1 and the center positions of the master disks.

After alignment of the master disks and the magnetic recording medium, the master disks are tightly adhered to the magnetic recording medium by a method such as vacuum adsorption or electrostatic adsorption. Next, permanent magnets are rotated and brought into proximity with the master disks from above the first master disk and from below the second master disk to perform magnetic transfer. After magnetic transfer, the magnets are rotated and separated from the master disks, and rotation is stopped at the point in time when a magnetic flux density that does not lead to a magnetization reversal at the position of the magnetic recording medium is reached.

FIGS. 7A–7D illustrate another embodiment of the master disks according to the present invention. This embodiment is different from the first embodiment in that, the disks are made from Si, thus not transparent. Because the master disks resulting from the Si substrate cannot transmit light, it is necessary to consider disposing, on the master disks, alignment marks 33, 34 for alignment between the two master disks so that observation can always be made from one side with a TV camera described later. In this respect, one of the two master disks has the alignment marks positioned opposite the side where the soft magnetic pattern is formed.

FIGS. 7A–7D illustrate the magnetic pattern side of first and second master disks. FIGS. 7A–7B illustrate the first master disk 30. The alignment marks 33 for aligning the two master disks are disposed at symmetrical positions, away from the center of the disk 30 as much as possible, outside of the magnetic pattern region, at the side opposite to the side where the magnetic pattern 32 comprising magnetic films is embedded, to raise alignment precision. It should be noted that alignment marks for aligning the master disks can be also formed on both sides of the master disk. FIGS. 7C–7D illustrate the second master disk 31. The alignment marks 34 for aligning the two master disks are disposed at symmetrical positions, outside of the magnetic pattern region, but on the same side as the magnetic pattern side. It should be noted that, in the above description, although the alignment marks 33 in the first master disk are disposed opposite to the magnetic pattern side the alignment marks 34 in the second master disk are disposed in the magnetic pattern side, they can be reversed. Also, the number of alignment marks of each master disk can exceed two.

FIGS. 8A–8D illustrate the manufacturing method of the first disk 30, where the alignment marks 33 are formed on the side opposite the magnetic pattern side. Note that the first disk 30 is illustrated with its lower side facing up. The both sides of the first disk are coated with a photoresist and developed to form the patterns of photomasks 35, 38 shown in FIGS. 9A–9B. That is, the upper side has the photomask 35 (FIG. 9A) and the lower side has the photomask 38 (FIG. 9B). On the upper side where the photomask 35 is formed, alignment marks 36 are patterned outside the region of the master disk) for aligning the upper and lower side photomasks 35, 38. Alignment marks 37 are also patterned on the upper side, outside the region of the master disk for aligning the upper and lower master disks 30, 31. On the lower side where the photomask 38 is formed, alignment marks 39 are patterned outside the region of the master disk) for aligning the upper and lower side photomasks 35, 38, and a magnetic transfer pattern 40 is set inside the region of the master disk. The alignment marks for aligning the upper and lower side photomasks are used to align the upper side photomask and the lower side photomask. As a result, alignment of the magnetic pattern of the first master disk and the magnetic pattern of the second master disk is effected by the alignment marks for aligning the upper and lower side photomasks and the alignment marks for aligning the first and second master disks.

Figure 8A:
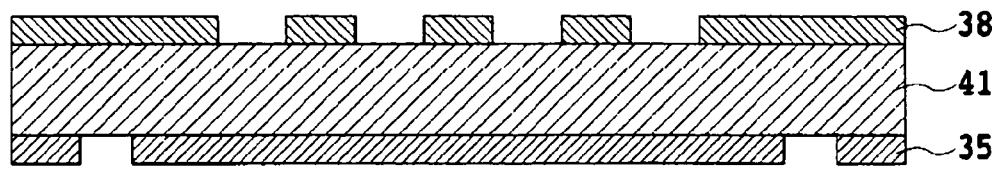
FIGS. 8A–8D illustrate another method of manufacturing the master disk according to the present invention.
Figure 8B:
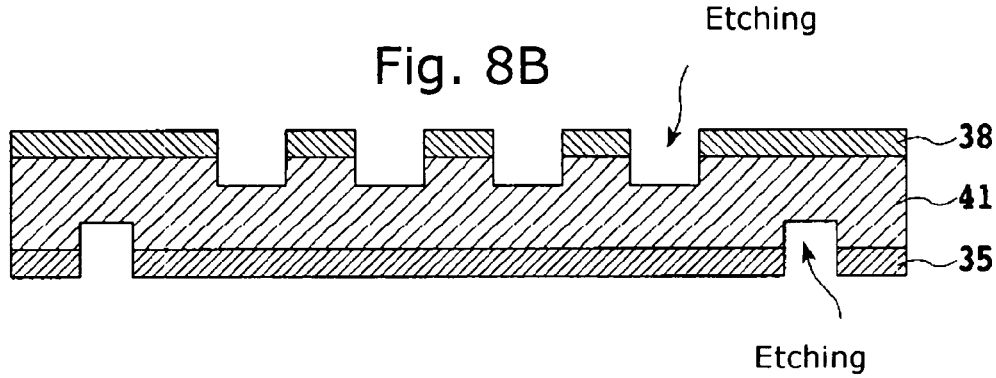
Figure 8C:
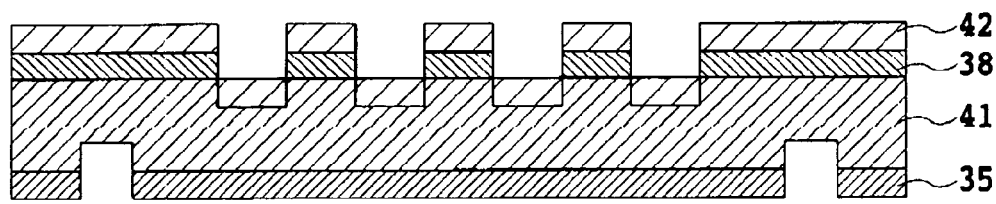
Figure 8D:
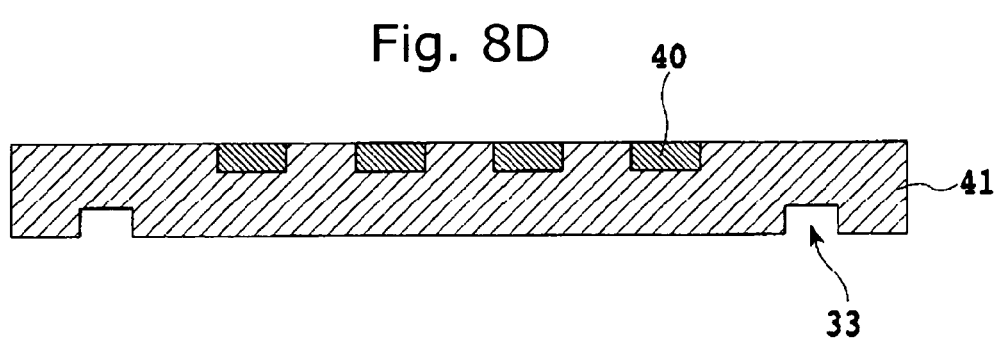

When the Si substrate is sandwiched with the patterned sides of the upper and lower side photomasks facing the Si substrate side forming the master disks, positional adjustment (orthogonal movement, rotational movement) of one photomask is conducted so that the alignment marks for aligning the upper and lower side photomasks are aligned. After positional adjustment is conducted in this manner, as shown in FIGS. 8A–8D, patterns are formed on both sides of the Si substrate 41 (FIG. 8A), then both sides are etched (FIG. 8B) to etch the patterns into the substrate 41, using the photoresist as masks. Then, a soft magnetic film 42 is formed by sputtering only on the side where the magnetic transfer pattern is formed (FIG. 8C). Thereafter, the photoresist/photomasks 35 and 38 are lifted off (FIG. 8D) to form the master disk 30. The second master disk 31 can be made the same way as in the first embodiment (see FIGS. 2A–2D).

The shape of the alignment marks described above is such that they can be mutually aligned as shown, for example, in FIGS. 4A–4D, to raise alignment precision. The positional relationship between the alignment marks and the magnetic patterns in the photomasks is such that the first master disk and the second master disk are in a symmetrical relationship. When the magnetic pattern surfaces of the first and second master disks face each other, and the position (X, Y, θ) of one master disk is adjusted with respect to the other fixed master disk so that the positions of the alignment marks match on the axial direction of the disks, as will be described later, the positions of the magnetic patterns match.

Figure 10:
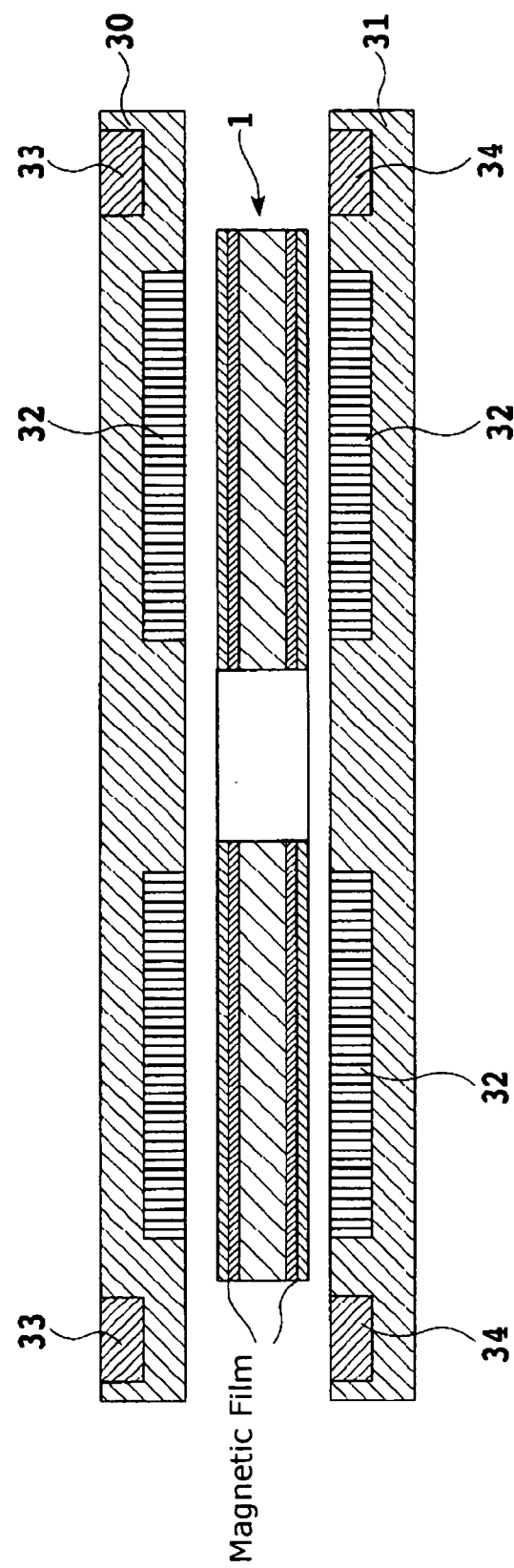
FIG. 10 illustrates the positional relationship of the magnetic recording medium and other master disks.
Figure 11:
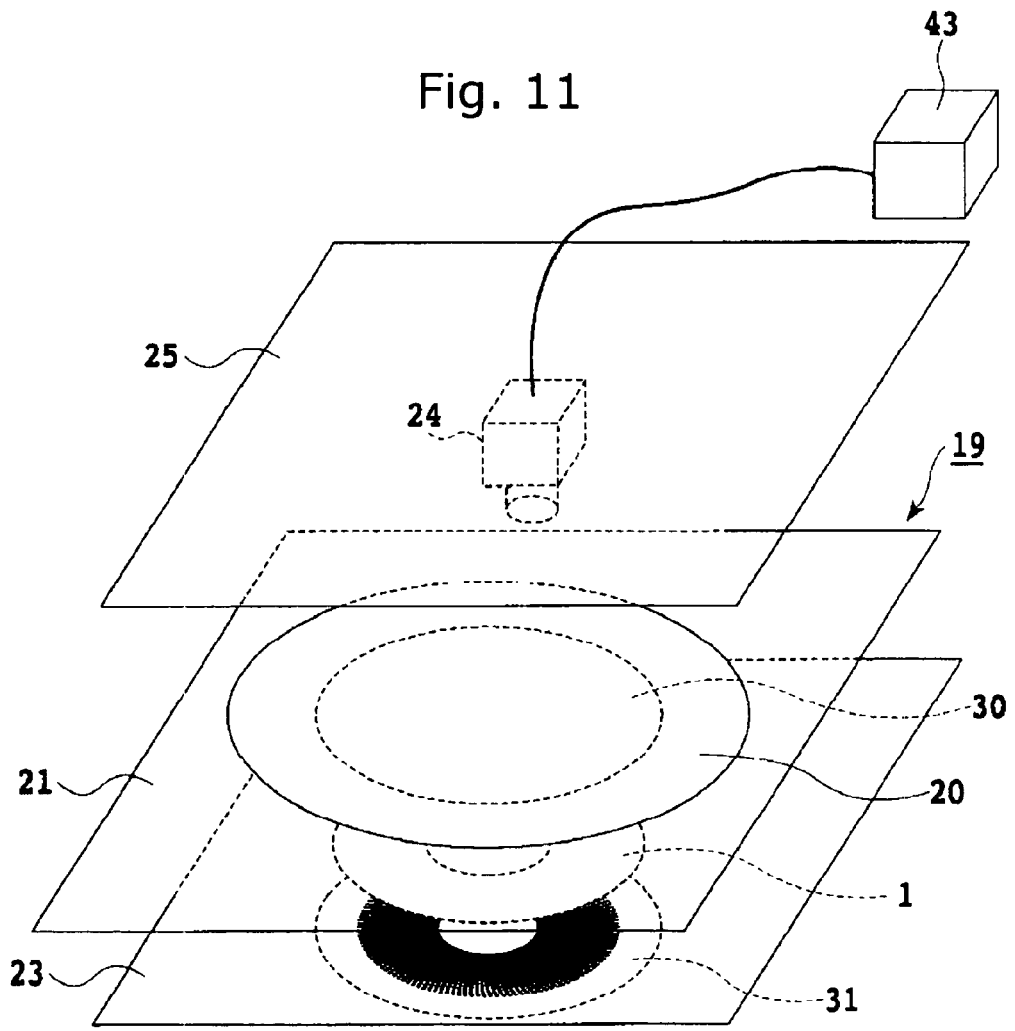
FIG. 11 illustrates another alignment device of the two-side magnetic transfer device according to the present invention.
Figure 12A:
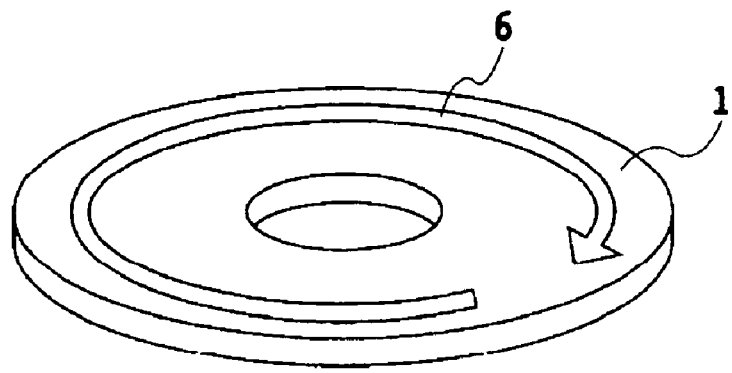
FIGS. 12A–12C illustrate explanatory diagrams of a magnetic transfer process in a magnetic recording medium.
Figure 12B:
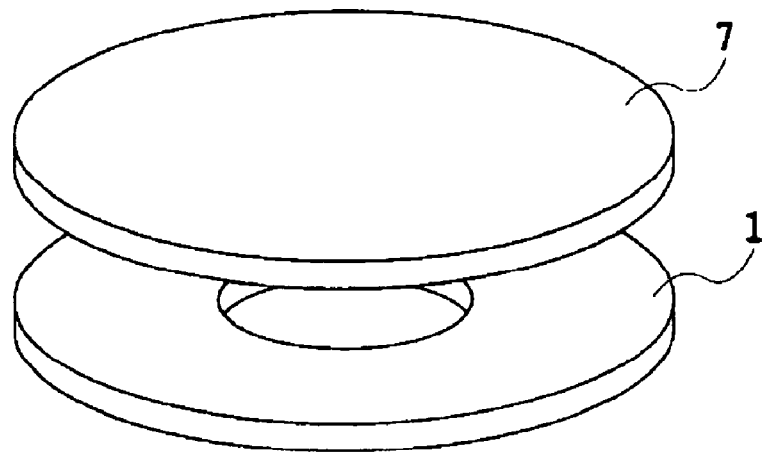
Figure 12C:
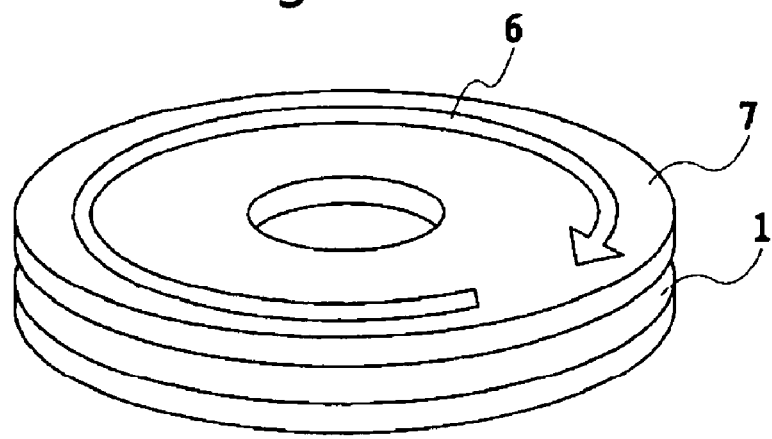
Figure 13A:
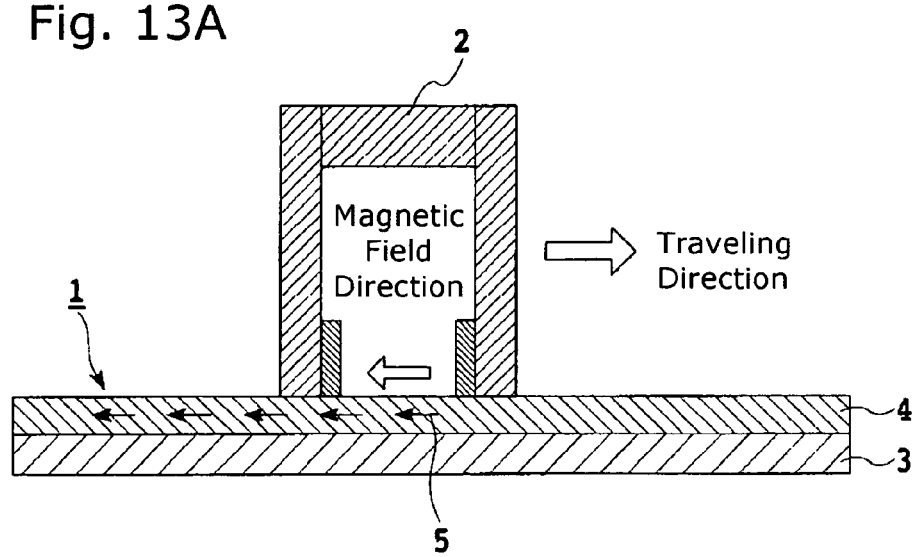
FIGS. 13A and 13B illustrate explanatory diagrams of the principle of magnetic transfer in a magnetic recording medium.
Figure 13B:
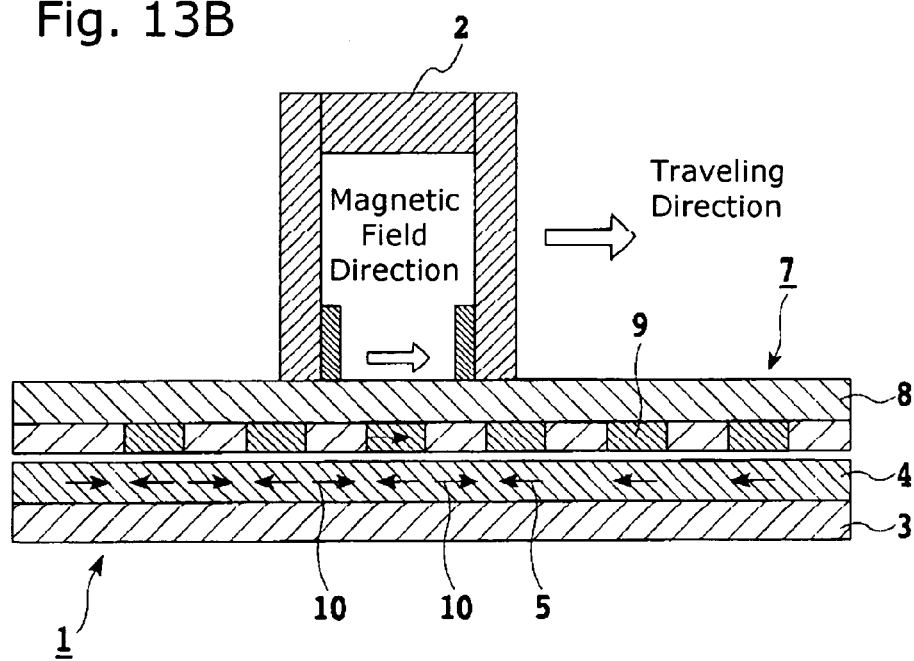

FIG. 10 illustrates the positional relationship between the magnetic recording medium 1 and the master disks 30 and 31. The magnetic recording medium 1 is sandwiched between the magnetic patterns 32 so that the magnetic pattern 32 of the second master disk 31 faces the lower side of the magnetic recording medium 1 and the magnetic pattern 32 of the first master disk 30 faces the upper side of the magnetic recording medium 1. For recording the magnetic patterns to the magnetic recording medium 1, a center misalignment of the magnetic patterns with the shape of the magnetic recording medium is checked to see that it is within an acceptable value and that any misalignment of the top and bottom magnetic patterns is within an acceptable value. For any misalignment to be equal to or less than the acceptable value, an alignment device of a two-side magnetic transfer device is configured as shown in FIG. 11 and alignment is conducted in the following manner. This alignment device is the same as the device of FIG. 6 except that it is not disposed with microscopes.

The second master disk 31 is fixedly positioned, with the magnetic pattern side facing up, so that the positions and shapes of the two alignment marks 34 can be observed with the television camera 24 that is disposed above the second master disk. The camera 24 is placed on the third stage 25 so that it can be moved therewith. The position can be stored in a memory of the signal processing device 43. The center of the second master disk 31 can be determined based on the positions and shapes of the alignment marks of the second master disk 31.

The magnetic recording medium 1 is placed on the second stage 23 disposed above the second master disk. The third stage 25 on which the television camera 24 is placed is controlled so that the end surface of the inner periphery of the magnetic recording medium 1 appears in the center of the screen of the television camera 24. The inner periphery is observed full circle, and the shape of the inner peripheral end of the magnetic recording medium 1 is measured from the movement amount of the stage and the positions of pixels corresponding to the inner peripheral end in the television screen. The center position of the magnetic recording medium 1 can be estimated from the shape of the inner peripheral end. The amount of misalignment between the center position of the magnetic recording medium 1 and the center position of the second master disk 31 is calculated. Thereafter, the second stage 23 on which the magnetic recording medium 1 is placed is moved to eliminate this misalignment amount and precisely align the center of the second master disk 31 and the center of the magnetic recording medium 1.

The first master disk 30 is placed on the first stage 19 disposed above the magnetic recording medium 1, with the alignment mark side facing up. The positions and shapes of the two alignment marks 33 disposed on the upper side of the first master disk 30 are observed with the television camera 24. In accompaniment with the movement of the X, Y stage 21 or the movement of the third stage 25, the positions thereof are stored in the signal processing device. The amount of orthogonal movement and the amount of rotational movement of the first master disk 30 are determined from the misalignment between the positions and shapes of the two alignment marks in the first master disk 30 and the positions and shapes of the two alignment marks in the second master disk 31 stored in the memory of the signal processing device 43. The movement of the rotating stage 20 on which the first master disk 30 is placed and the X, Y stage 21 is controlled to align the two pairs of alignment marks (state of FIG. 4C).

After aligning the master disks and the magnetic recording medium, magnetic transfer is conducted in the same manner as in the first embodiment.

As described above, in the present invention, the magnetic pattern of the one master disk and the magnetic pattern of another master disk becomes possible. Thus, for example, even if the reading and writing cylinders are changed from one side to the other side of the recording medium, even data reading and writing time is enabled without greatly changing the time until position stabilization of the HSA.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosures of the priority applications JP 2002-332641 and JP 2002-375405 in their entirety, including the drawings, claims, and the specification thereof, are incorporated herein by reference.

What is claimed is:

1. A master disk device for transferring magnetic patterns to both sides of a magnetic recording medium, comprising:
   a first master disk having a first magnetic pattern formed on one side thereof for transferring the first magnetic pattern to one side of the magnetic recording medium; and
   a second master disk having a second magnetic pattern formed on one side thereof for transferring the second magnetic pattern to the other side of the magnetic recording medium,
   wherein each of the first and second master disks has at least two alignment marks disposed outside the region of the magnetic pattern,
   wherein the alignment marks of the first master disk and the alignment marks of the second master disk have complementary configurations, and
   wherein the alignment marks of the first or second master disk are rotationally alignable with the magnetic recording medium.

2. The device according to claim 1, wherein the alignment marks of each of the master disks are symmetrically disposed with respect to predetermined reference points of the respective magnetic pattern.

3. The device according to claim 1, wherein the master disks are optically transparent or semi-transparent.

4. The device according to claim 1, wherein the alignment marks of at least one of the first and second master disks are positioned on the same side where the magnetic pattern is formed.

5. The device according to claim 4, wherein the alignment marks of the other of the first and second master disks are positioned on the side opposite where the magnetic pattern is formed.

6. The device according to claim 1, wherein each of the alignment marks on first and second master disk are positioned off the center thereof.

7. A master disk device for transferring magnetic patterns to both sides of a magnetic recording medium, comprising:
   a first master disk having a first magnetic pattern formed on one side thereof for transferring the first magnetic pattern to one side of the magnetic recording medium; and a second master disk having a second magnetic pattern formed on one side thereof for transferring the second magnetic pattern to the other side of the magnetic recording medium, wherein each of the first and second master disks has at least two alignment marks disposed outside the region of the magnetic pattern, and wherein the alignment marks of each of the first and second master disks are positioned on the same side where the respective magnetic pattern is formed.

8. The device according to claim 7, wherein at least one of the first and second master disks are transparent or semi-transparent.

9. The device according to claim 7, wherein both the first and second master disks are transparent or semi-transparent.

10. A device for aligning a magnetic recording medium to a pair of master disks comprising a first master disk having a first magnetic pattern formed on one side thereof for transferring the first magnetic pattern to one side of the magnetic recording medium, a second master disk having a second magnetic pattern formed on one side thereof for transferring the second magnetic pattern to the other side of the magnetic recording medium, wherein each of the first and second master disks has at least two alignment marks disposed outside a region of the magnetic pattern, the device comprising:

a first stage for movably and rotatably holding one of the first and second master disks;

a second stage for movably holding the magnetic recording medium between the first and second master disks, wherein the first and second master disks are positioned with the magnetic pattern sides thereof facing the magnetic recording medium; and observing means for observing the positions of the alignment marks of the first and second master disks and an end surface position of an inner periphery or an outer periphery of the magnetic recording medium.

11. The device according to claim 10, wherein the observing means includes:

first observing means for observing only the positions of the alignment marks of the first and second master disks; and second observing means for observing the positions of the alignment marks of the pair of master disks and the end surface position of the inner periphery or the outer periphery of the magnetic recording medium.

12. The device according to claim 10, wherein the master disks are optically transparent or semi-transparent.

13. The device according to claim 10, wherein the alignment marks of at least one of the first and second master disks are positioned on the same side where the magnetic pattern is formed.

14. The device according to claim 13, wherein the alignment marks of the other of the first and second master disks are positioned on the side opposite where the magnetic pattern is formed.

15. The device according to claim 10, wherein the alignment marks of each of the first and second master disks are positioned on the same side where the respective magnetic pattern is formed.

16. The device according to claim 15, wherein at least one of the first and second master disks are transparent or semi-transparent.

17. The device according to claim 15, wherein both the first and second master disks are transparent or semi-transparent.

18. A method of aligning a magnetic recording medium to a pair of master disks comprising a first master disk having a first magnetic pattern formed on one side thereof for transferring the first magnetic pattern to one side of the magnetic recording medium and a second master disk having a second magnetic pattern formed on one side thereof for transferring the second magnetic pattern to the other side of the magnetic recording medium, wherein each of the first and second master disk is transparent or semi-transparent, and has at least two alignment marks disposed outside a region of the magnetic pattern, the method comprising the steps of:

positioning the first master disks next to the second master disk so that the first and second magnetic patterns face each other;

moving or rotating, or both, one of the master disks that is transparent or semi-transparent relative to the other while observing the alignment marks of the first and second master disks with first observing means to align the alignment marks of the first and second master disks;

positioning the magnetic recording medium between the first and second master disks;

observing with second observing means the alignment marks of the master disks and an inner peripheral or outer peripheral end surface of the magnetic recording medium; and moving the magnetic recording medium with respect to the aligned first and second master disks based on observation results of the second observing means.

19. The method according to claim 18, wherein the first observation means and the second observation means observe the alignment marks through the first and second magnetic disks.

20. The method according to claim 18, wherein the alignment marks of the first and second master disks are positioned on the same side where the respective magnetic pattern is formed.

21. A method of aligning a magnetic recording medium to a pair of master disks comprising a first master disk having a first magnetic pattern formed on one side thereof for transferring the first magnetic pattern to one side of the magnetic recording medium and a second master disk having a second magnetic pattern formed on one side thereof for transferring the second magnetic pattern to the other side of the magnetic recording medium, wherein each of the first and second master disks has at least two alignment marks disposed outside a region of the magnetic pattern, the method comprising the steps of:

fixing the position of one of the first and second master disks;

observing the alignment marks of the one master disk with observing means;

movably positioning the magnetic recording medium next to the one master disk with the magnetic pattern side of the one master disk facing the magnetic recording medium;

observing with the observing means, an inner peripheral or outer peripheral end surface of the magnetic recording medium positioned next to the one master disk;

moving the magnetic recording medium with respect to the one master disk based on observation results of the observation of the alignment marks of the one master disk and the magnetic recording medium to align the magnetic recording medium with respect to the one master disk;

movably and rotatably positioning the other of the master disks next to the magnetic recording medium so that the magnetic recording medium is positioned between the first and second master disks and the magnetic pattern side of the other master disk facing the magnetic recording medium;

observing with the observing means the alignment marks of the other magnetic disk; and moving or rotating or both the other master disk with respect to the one master disk based on the observation results of the alignment marks of the one master disk and the other master disk to align the marks of the first and second master disks.

22. The method according to claim 21, wherein the alignment marks of the other master disk are positioned on the same side where the magnetic pattern is formed.

23. The method according to claim 22, wherein the alignment marks of the one master disk are positioned on the side opposite where the magnetic pattern is formed.

* * * * *